United States Patent
Asuncion et al.

(10) Patent No.: US 8,193,790 B2
(45) Date of Patent: Jun. 5, 2012

(54) SWITCHING POWER CONVERTER AND CONTROLLER

(75) Inventors: Arlaindo V. Asuncion, Paranaque (PH); Evan M. Espina, Zurich (CH)

(73) Assignee: Astec International Limited, Kwun Tong, Kowloon (HK)

( * ) Notice: Subject to any disclaimer, the term of this patent is extended or adjusted under 35 U.S.C. 154(b) by 907 days.

(21) Appl. No.: 12/188,712

(22) Filed: Aug. 8, 2008

(65) Prior Publication Data
US 2010/0033143 A1 Feb. 11, 2010

(51) Int. Cl.
*G05F 1/00* (2006.01)
(52) U.S. Cl. .......................... 323/282; 323/284; 323/285
(58) Field of Classification Search .................. 323/282, 323/284, 285, 299
See application file for complete search history.

(56) References Cited

U.S. PATENT DOCUMENTS

| | | | |
|---|---|---|---|
| 6,115,266 A | | 9/2000 | Matsui et al. |
| 6,934,672 B2 * | | 8/2005 | Hesse .............................. 703/14 |
| 7,009,372 B2 | | 3/2006 | Sutardja et al. |
| 7,755,342 B2 * | | 7/2010 | Chen et al. ..................... 323/283 |
| 7,888,924 B2 * | | 2/2011 | Tran et al. ...................... 323/284 |
| 2008/0042709 A1 | | 2/2008 | Chen et al. |
| 2008/0088284 A1 * | | 4/2008 | Weng ............................. 323/271 |
| 2008/0088292 A1 * | | 4/2008 | Stoichita et al. ............... 323/285 |
| 2008/0205087 A1 * | | 8/2008 | Asuncion et al. ............... 363/15 |

FOREIGN PATENT DOCUMENTS
WO  2007/130533  11/2007
* cited by examiner

*Primary Examiner* — Adolf Berhane
*Assistant Examiner* — Emily Pham
(74) *Attorney, Agent, or Firm* — Harness, Dickey & Pierce, P.L.C.

(57) ABSTRACT

A switching power converter includes an input for receiving an input voltage, an output for providing an output voltage, a controller, and a power circuit coupled between the input and the output and including at least one switch. The controller is configured to determine a duty cycle for the switch to regulate the output voltage and control the switch with a PWM drive signal having an on-time and an off-time. The PWM drive signal has a constant frequency and a duty cycle equal to the determined duty cycle when the determined duty cycle is greater than or equal to a minimum duty cycle. The PWM drive signal has a variable frequency and a duty cycle equal to the minimum duty cycle when the determined duty cycle is less than the minimum duty cycle.

27 Claims, 3 Drawing Sheets

SWITCHING POWER CONVERTER AND CONTROLLER

FIELD

The present disclosure relates to switching power converters and controllers for controlling switching power converters.

BACKGROUND

The statements in this section merely provide background information related to the present disclosure and may not constitute prior art.

Switching power supplies contain, in addition to other components, one or more magnetic components, e.g. inductors, transformers, etc., through which a current flows and one or more switches to control the flow of current from an input power source. The switch, or switches, are turned on and off in a cycle. The ratio of on-time to off-time is the switch's duty cycle. One way the output of some power supplies is regulated is by varying the ratio of the on-time to the off-time of the switch, i.e. varying the duty cycle. The specific operation of various power supply topologies is well known and for the sake of brevity will not be further discussed herein.

There are at least three modes in which switching power supplies may be operated. In continuous conduction mode (CCM), the current through a power supply magnetic element is always higher than zero in each switching period. When a power supply operates such that the current through a magnetic element is zero for an infinitely small time in each switching period, it is said to operate in critically discontinuous conduction mode (CDCM). Finally, when operated in discontinuous conduction mode (DCM), a power supply operates such that the current through the magnetic element is zero for a measurable amount of time in each switching period.

SUMMARY

According to one aspect of the present disclosure, a switching power converter includes an input for receiving an input voltage, an output for providing an output voltage, a controller, and a power circuit coupled between the input and the output and including at least one switch. The controller is configured to determine a duty cycle for the switch to regulate the output voltage and to control the switch with a PWM drive signal having an on-time and an off-time. The PWM drive signal has a constant frequency and a duty cycle equal to the determined duty cycle when the determined duty cycle is greater than or equal to a minimum duty cycle. The PWM drive signal has a variable frequency and a duty cycle equal to the minimum duty cycle when the determined duty cycle is less than the minimum duty cycle.

According to another aspect of the present disclosure, a switching power converter includes an input for receiving an input voltage, an output for providing an output voltage, a controller, and a power circuit coupled between the input and the output and including at least one switch. The controller is configured to determine a duty cycle for the switch to regulate the output voltage and control the power circuit in a continuous conduction mode (CCM) when the determined duty cycle is greater than or equal to a minimum duty cycle. The controller is also configured to control the power circuit in a critically discontinuous conduction mode (CDCM) when the determined duty cycle is less than the minimum duty cycle.

According to yet another aspect of the present disclosure, a controller is disclosed for controlling a switching power converter having an input for receiving an input voltage, an output for providing an output voltage and a power circuit coupled between the input and the output and including at least one switch. The controller includes a feedback controller for monitoring the output voltage and determining a duty cycle for the power circuit to regulate the output voltage and an on-time generator coupled to the feedback controller. The on-time generator is configured to determine an on-time duration for the switch based at least in part on the determined duty cycle and a set switching frequency. The controller also includes an off-time generator coupled to the feedback controller and the on-time generator. The off-time generator is configured to determine an off-time duration for the switch for use in continuous conduction mode (CCM) operation of the switching converter circuit when the determined duty cycle is greater than or equal to a minimum duty cycle and in critically discontinuous conduction mode (CDCM) operation of the switching converter circuit when the determined duty cycle is less than the minimum duty cycle. The controller further includes a pulse width modulation (PWM) generator coupled to the on-time generator, the off-time generator and the power circuit and configured to provide control signals for the switch based on the determined on-time duration and the determined off-time duration.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

According to one aspect of the present disclosure a switching power converter includes an input for receiving an input voltage, an output for providing an output voltage, a controller, and a power circuit coupled between the input and the output and including at least one switch. The controller is configured to determine a duty cycle for the switch to regulate the output voltage and to control the switch with a PWM drive signal having an on-time and an off-time. The PWM drive signal has a constant frequency and a duty cycle equal to the determined duty cycle when the determined duty cycle is greater than or equal to a minimum duty cycle. The PWM drive signal has a variable frequency and a duty cycle equal to the minimum duty cycle when the determined duty cycle is less than the minimum duty cycle.

According to another aspect of the present disclosure, a switching power converter includes an input for receiving an input voltage, an output for providing an output voltage, a controller, and a power circuit coupled between the input and the output and including at least one switch. The controller is configured to determine a duty cycle for the switch to regulate the output voltage and control the power circuit in a continuous conduction mode (CCM) when the determined duty cycle is greater than or equal to a minimum duty cycle. The controller is also configured to control the power circuit in a critically discontinuous conduction mode (CDCM) when the determined duty cycle is less than the minimum duty cycle.

By employing either or both of these aspects, a switching power converter can avoid inductor current oscillations without requiring sensing of the inductor current or power switch voltage.

Some examples of switching power converters suitable for carrying out one or more of these aspects will now be described with reference to FIGS. 1-3. It should be understood, however, that a wide variety of other converters and controllers can be employed without departing from the scope of this disclosure.

Figure 1:
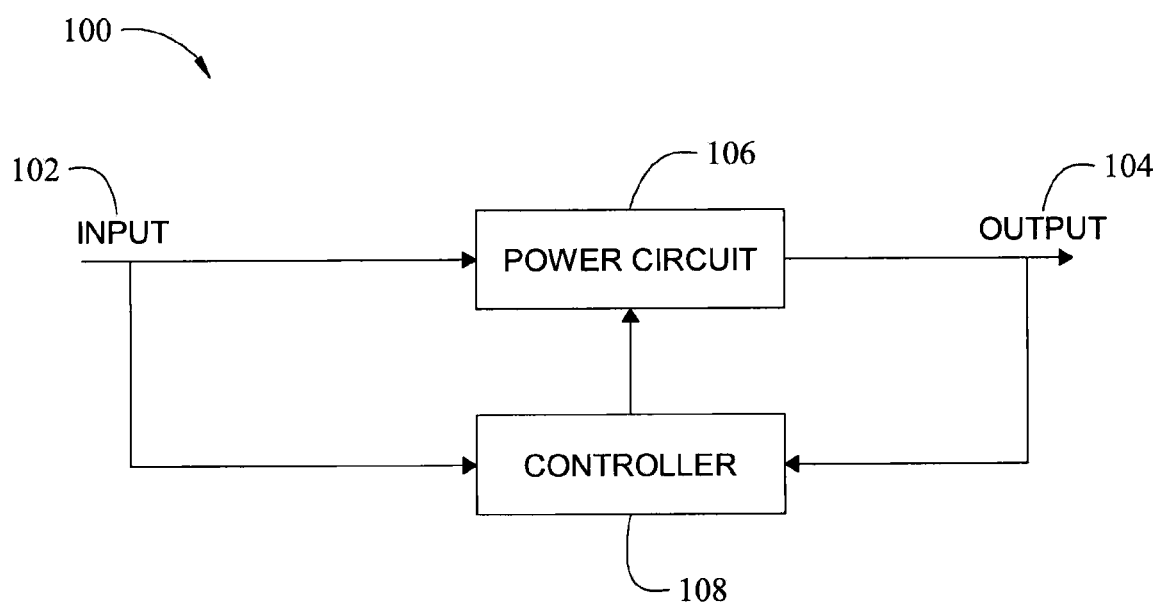
FIG. 1 is a block diagram of a switching power converter including a power circuit and a controller configured to operate the power circuit according to one example of the present disclosure.

One example of a switching power converter is illustrated in FIG. 1 and indicated generally by reference numeral 100. As shown in FIG. 1, the switching power converter 100 includes an input 102 for receiving an input voltage and an output 104 for providing an output voltage. A power circuit 106 is coupled between the input 102 and the output 104. The power circuit 106 includes at least one switch (not illustrated). The switching power converter 100 also includes a controller 108. The controller 108 is configured to determine a duty cycle for the switch based on the output voltage to regulate the output voltage. The controller 108 is further configured to control the power circuit 106 in a continuous conduction mode (CCM) and a critically discontinuous conduction mode (CDCM). The controller 108 controls the power circuit 106 in CCM when the determined duty cycle is greater than or equal to a minimum duty cycle and controls the power circuit 106 in CDCM when the determined duty cycle is less than the minimum duty cycle. The minimum duty cycle may be a calculated minimum duty cycle or a predetermined minimum duty cycle, as further explained below.

When power drawn by a load coupled to the output 104 of the switching power converter 100 decreases, the determined duty cycle decreases. So long as the determined duty cycle is greater than or equal to the minimum duty cycle, the controller 108 operates the power circuit 106 in CCM (e.g., using voltage mode control). However, when the power drawn by the load decreases such that the determined duty cycle is less than the minimum duty cycle, the controller shifts to CDCM control.

When the controller 108 operates the power circuit 106 in CCM (e.g., using voltage mode control), the controller 108 controls the duty cycle of the switch according to the determined duty cycle at a fixed frequency. However, when the controller 108 operates the power circuit 106 in CDCM, the duty cycle of the switch is altered from the determined duty cycle and the fixed frequency. The duration of the on-time of the switch is controlled in accordance with the determined duty cycle while the duration of the off-time of the switch is controlled based on the on-time duration and the minimum duty cycle. Generally, the off-time duration is adjusted to maintain a substantially constant duty cycle equal to the minimum duty cycle even if the on-time duration changes. This results in switching cycles having variable frequencies that increase as the power drawn by the load, and the determined duty cycle, decrease.

Additionally, the controller 108 can be configured with a maximum frequency to prevent excessively high switching frequencies when operating in CDCM. During CDCM operation, the lower the determined duty cycle, the greater the switching frequency of the switch. At near zero load conditions, the determined duty cycle may be very low causing the switching frequency, if unrestrained, to reach excessively high frequencies. When the switching frequency reaches the maximum frequency, however, the determined off-time duration is prevented from decreasing beyond a minimum off-time to avoid exceeding the maximum frequency.

Figure 2:
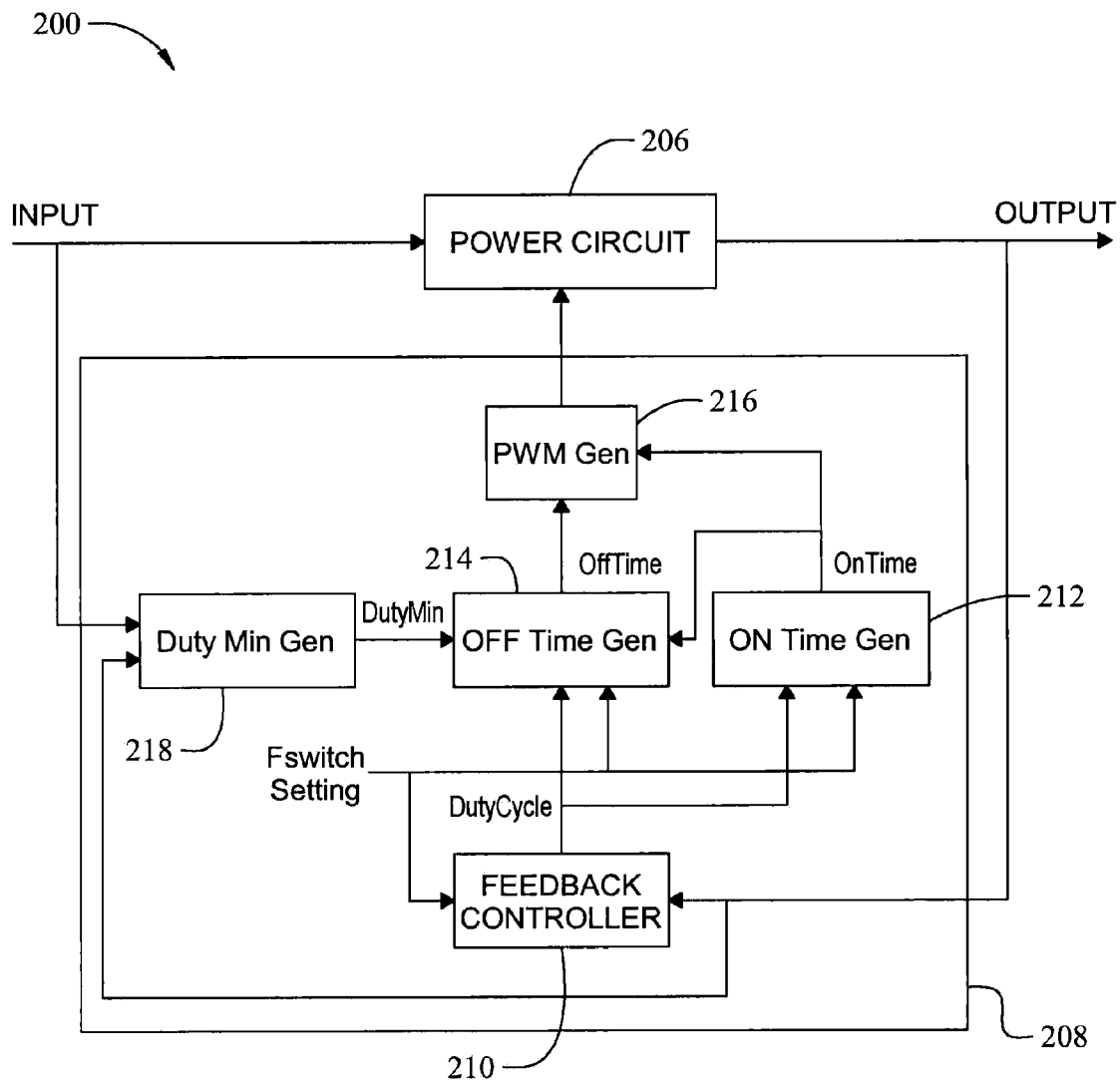
FIG. 2 is a block diagram of a switching power converter including a power circuit and a controller including a feedback controller and generators to operate the power circuit according to another example of the present disclosure.

A controller 208 suitable for carrying out one or more aspects of this disclosure is illustrated as part of a switching power converter 200 in FIG. 2. The controller 208 includes several elements each configured to perform certain tasks. The controller 208 includes a feedback controller 210 for monitoring the output voltage and determining a duty cycle for the switch (not shown) in a power circuit 206 to regulate the output voltage. An on-time generator 212 is coupled to the feedback controller 210 and is configured to determine an on-time duration for the switch based on the determined duty cycle and a set switching frequency. An off-time generator 214 is coupled to the feedback controller 210 and the on-time generator 212. The off-time generator 214 is configured to determine an off-time duration for the switch for use in continuous conduction mode (CCM) operation of the power circuit 206 when the determined duty cycle is greater than or equal to a minimum duty cycle. The off-time generator 214 is also configured to determine an off-time duration for the switch for use in critically discontinuous conduction mode (CDCM) operation of the power circuit 206 when the determined duty cycle is less than the minimum duty cycle. A pulse width modulation (PWM) generator 216 is coupled to the on-time generator 212, the off-time generator 214 and the power circuit 206. The PWM generator 216 is configured to provide control signals for the switch based on the determined on-time duration and the determined off-time duration.

The minimum duty cycle may be a preset value or a generated value. The controller 208 in FIG. 2 includes a minimum duty generator 218. The minimum duty 218 generator monitors characteristics of the switching power supply 200, such as the input voltage and the output voltage, and determines a value for the minimum duty cycle. This value is then provided to the off-time generator 214 for use in determining whether the determined duty cycle is less than the minimum duty cycle.

A power circuit according to the present disclosure may be any type of switching power converter circuit. For example, the power circuit 106, 206 may be a buck converter, a buck converter-derived topology, such as a forward converter, a full bridge converter, etc. Similarly, the power circuit 106, 206 may be a boost converter, a boost converter-derived topology, such as a flyback converter, etc.

Figure 3:
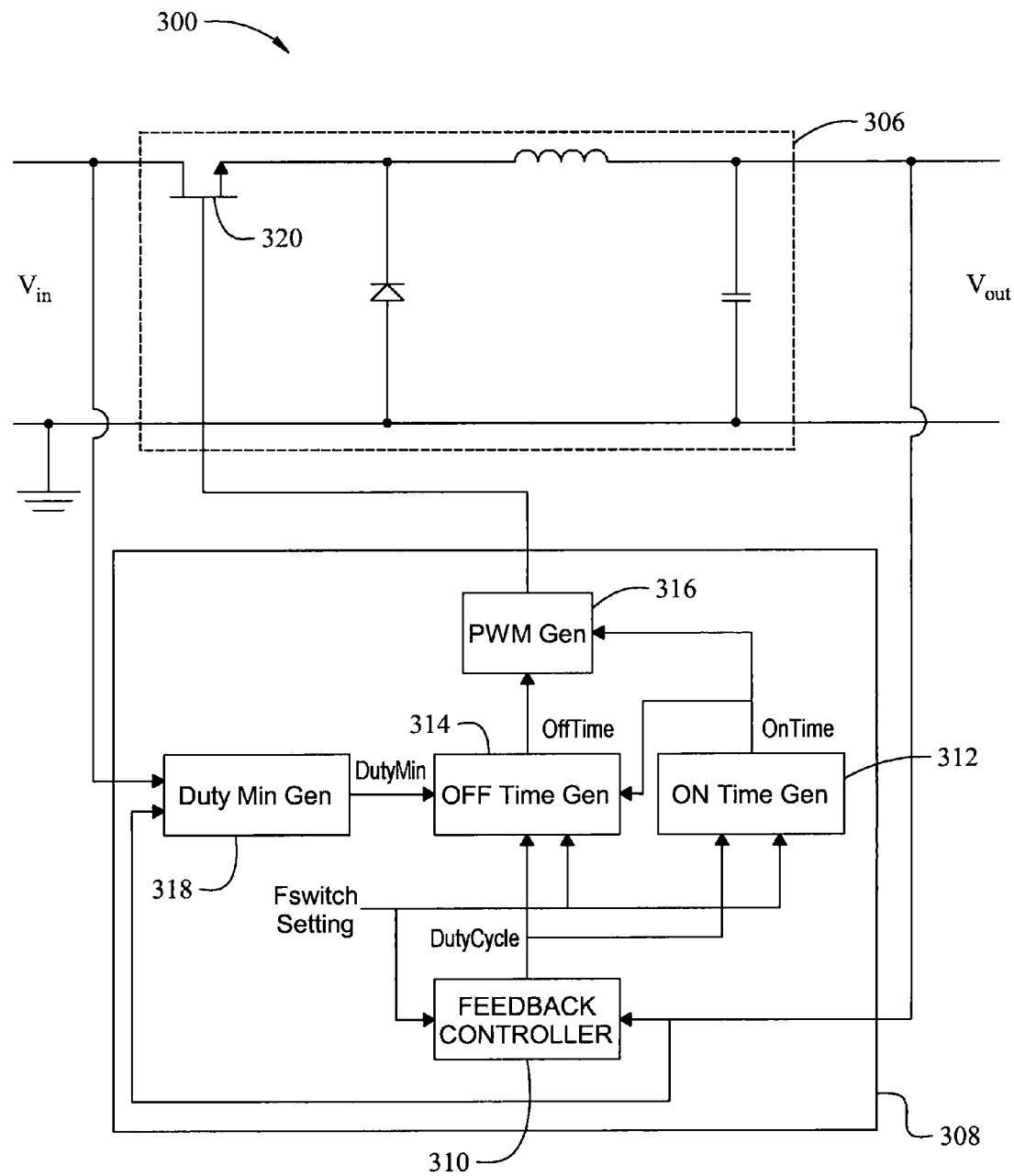
FIG. 3 is a diagram of a switching power converter including a buck converter power circuit and a controller configured to operate the power circuit according to another example of the present disclosure.

Another example of a switching power converter 300 according to the present disclosure is shown in FIG. 3. The example switching power converter 300 is a DC-DC converter including a buck topology power circuit 306 having an input voltage (Vin), an output voltage (Vout) and a set frequency. When operating in CCM, the duty cycle of the switch 320 in the power circuit 306 is approximately equal to Vout/Vin. The minimum duty cycle is assigned the value of Vout/Vin. The minimum duty cycle can either be generated by a minimum duty generator 318 or be pre-programmed into the controller 308.

A feedback controller 310 senses the output voltage and determines a duty cycle for the switch 320 to regulate the output voltage. An on-time generator 312 and an off-time generator 314 use this determined duty cycle to determine an on-time duration and an off-time duration for the switch 320, respectively.

When the feedback controller 310 computes a duty cycle that is greater than or equal to the minimum duty cycle, the operating mode is set for voltage controlled CCM. However, if the computed duty cycle is less than the minimum duty cycle, the control mode is shifted to CDCM.

When operating in CCM, the on-time duration and the off-time duration are generated by their respective generators based on the set frequency. The on-time duration is computed as: on-time duration=(determined duty cycle)/(set frequency). Similarly, the off-time duration is computed as: off-time duration=(1−determined duty cycle)/(set frequency).

These parameters are then used by a PWM generator 316 to generate the drive logic for the switch 320. As long as the load demand is high enough for CCM operation (i.e., the determined duty cycle is greater than or equal to the minimum duty cycle), the controller 308 generates drive logic similar to a regular PWM controller using voltage mode control.

When the load demand coupled to the switching power converter 300 is not large enough for CCM operation, i.e. the determined duty cycle is less than the minimum duty cycle, the controller 308 shifts to CDCM control. The on-time duration is computed in the same manner as above by the on-time generator 312. However, computation of the off-time duration by the off-time generator 314 is adjusted for CDCM control. During CDCM operation, the off-time generator 314 computes the off-time duration so that the duty cycle of the drive logic generated by the PWM generator 316 is equal to the minimum duty cycle. Specifically, the off-time duration is computed as:

$$OffTimeDuration = \frac{OnTimeDuration}{MinimumDutyCycle} - OnTimeDuration.$$

During CDCM operation, therefore, the on-time duration may vary depending on the determined duty cycle while the off-time duration is computed to maintain the minimum duty cycle. When operating in CDCM, the controller 308 provides a constant-duty, variable-frequency PWM drive logic to maintain the example switching power supply 300 in CDCM operation during light load conditions.

As discussed above, such a configuration may result in very high frequency operation at near zero load conditions because of a very low determined duty cycle. To provide a maximum frequency, the off-time generator 314 can be programmed to saturate at a minimum off-time duration when operating in CDCM.

Although the controller 308, 208 are illustrated as comprising several discrete devices, e.g. feedback controller 210, 310, on-time generator 212, 312, etc., the controller 308, 208 may also be a digital controller configured to perform all of the controller functions described above.

Although the power converters described above may incorporate more than one aspect of the present disclosure, it should be understood that that each of the aspects of the present disclosure may be used independently. For example, a power converter may operate according to at least one aspect of the present disclosure without switching control modes (e.g., it may operate solely in CDCM).

When introducing elements or features and specific embodiments, the articles "a," "an," "the" and "said" are intended to mean that there are one or more of such elements or features. The terms "comprising," "including" and "having" are intended to be inclusive and mean that there may be additional elements or features other than those specifically noted. Further, and unless stated otherwise, the processes and operations described herein are not to be construed as necessarily requiring their performance in the particular order discussed or illustrated, and may be performed with additional steps or operations other than those specifically noted.

While various features and embodiments have been described above, those skilled in the art will recognize that various changes and modifications may be made without departing from the scope of this disclosure. Accordingly, it is intended that this disclosure be limited only by the scope of the claims presented below, and their equivalents.

What is claimed is:

1. A switching power converter comprising:
an input for receiving an input voltage;
an output for providing an output voltage;
a power circuit coupled between the input and the output and including at least one switch; and
a controller configured to:
determine a duty cycle (DutyCycle) for the switch to regulate the output voltage; and
control the switch with a PWM drive signal having an on-time (OnTime) and an off-time (OffTime);
wherein the PWM drive signal has a constant frequency and a duty cycle equal to the determined duty cycle when the determined duty cycle is greater than or equal to a minimum duty cycle (DutyMin); and
wherein the PWM drive signal has a variable frequency and a duty cycle equal to the minimum duty cycle when the determined duty cycle is less than the minimum duty cycle.

2. The converter of claim 1 wherein the switch has a frequency setting (Fswitch), and wherein the OnTime=DutyCycle×(1/Fswitch).

3. The converter of claim 2 wherein the OffTime=(1−DutyCycle)×(1/Fswitch) when the determined duty cycle is greater than or equal to the minimum duty cycle.

4. The converter of claim 3 wherein the OffTime=(OnTime/DutyMin)−OnTime when the determined duty cycle is less than the minimum duty cycle.

5. The converter of claim 4 wherein the controller is a digital controller.

6. The converter of claim 5 wherein the controller is configured to operate the converter in voltage control mode when the determined duty cycle is greater than or equal to the minimum duty cycle.

7. The converter of claim 1 wherein the power circuit includes a magnetic element but does not include a current sensor for sensing a current through the magnetic element.

8. The converter of claim 1 wherein the converter does not sense a voltage across the switch.

9. The converter of claim 1 wherein the power circuit does not include a saturable choke in series with an output choke.

10. The converter of claim 1 wherein the converter operates in continuous conduction mode (CCM) when the determined duty cycle is greater than or equal to the minimum duty cycle and in critically discontinuous conduction mode (CDCM) when the determined duty cycle is less than the minimum duty cycle.

11. The converter of claim 1 wherein the controller is configured to calculate the minimum duty cycle.

12. The converter of claim 1 wherein the minimum duty cycle is a predetermined minimum duty cycle.

13. A switching power converter comprising:
an input for receiving an input voltage;
an output for providing an output voltage;
a power circuit coupled between the input and the output and including at least one switch; and
a controller configured to:
determine a duty cycle for the switch to regulate the output voltage;
control the power circuit in a continuous conduction mode (CCM) when the determined duty cycle is greater than or equal to a minimum duty cycle; and
control the power circuit in a critically discontinuous conduction mode (CDCM) by adjusting an on-time duration and an off-time duration of the switch when the determined duty cycle is less than the minimum duty cycle.

14. The switching power converter of claim 13, wherein the minimum duty cycle is a determined minimum duty cycle and the controller is further configured to determine the determined minimum duty cycle based at least in part on the input voltage and the output voltage.

15. The converter of claim 13, wherein the controller is further configured to control the power circuit using the minimum duty cycle when the determined duty cycle is less than the minimum duty cycle.

16. The converter of claim 13, wherein the controller is further configured to increase a switching frequency of the power circuit as the determined duty cycle decreases when the determined duty cycle is less than the minimum duty cycle.

17. The converter of claim 16, wherein the controller is further configured to not increase the switching frequency above a maximum switching frequency when the determined duty cycle is less than the minimum duty cycle.

18. The converter of claim 13, wherein the controller is further configured to determine the on-time duration for the at least one switch based at least in part on the determined duty cycle and to determine the off-time duration based at least in part on the minimum duty cycle and the determined on-time duration for the at least one switch when the determined duty cycle is less than the minimum duty cycle.

19. The converter of claim 18, wherein the controller is further configured to determine the on-time duration and the off-time duration for the at least one switch based at least in part on the determined duty cycle when the determined duty cycle is greater than or equal to the minimum duty cycle.

20. The switching power converter of claim 19, wherein the controller is further configured to increase a switching frequency of the power circuit as the determined duty cycle decreases when the determined duty cycle is less than the minimum duty cycle.

21. The switching power converter of claim 19, wherein the controller is further configured to determine the on-time duration for the at least one switch based on a predetermined switching frequency of the power circuit regardless of the relationship of the determined duty cycle to the minimum duty cycle.

22. The switching power converter of claim 13, wherein the minimum duty cycle is a predetermined minimum duty cycle.

23. A controller for controlling a switching power converter including an input for receiving an input voltage, an output for providing an output voltage and a power circuit coupled between the input and the output and including at least one switch, the controller comprising:
a feedback controller for monitoring the output voltage and determining a duty cycle (DutyCycle) for the power circuit to regulate the output voltage;
an on-time generator coupled to the feedback controller and configured to determine an on-time duration (OnTime) for the switch based at least in part on the determined duty cycle and a set switching frequency;
an off-time generator coupled to the feedback controller and the on-time generator and configured to determine an off-time duration (OffTime) for the switch resulting in continuous conduction mode (CCM) operation of the switching converter circuit when the determined duty cycle is greater than or equal to a minimum duty cycle (DutyMin) and resulting in critically discontinuous conduction mode (CDCM) operation of the switching converter circuit when the determined duty cycle is less than the minimum duty cycle; and
a pulse width modulation (PWM) generator coupled to the on-time generator, the off-time generator and the power circuit and configured to provide control signals for the switch based on the determined on-time duration and the determined off-time duration.

24. The controller of claim 23 wherein the switch has a frequency setting (Fswitch), and wherein the OnTime=DutyCycle×(1/Fswitch).

25. The controller of claim 24 wherein the OffTime=(OnTime/DutyMin)−OnTime when the determined duty cycle is less than the minimum duty cycle.

26. A switching power converter comprising:
an input for receiving an input voltage;
an output for providing an output voltage;
a power circuit coupled between the input and the output and including at least one switch; and
a controller configured to:
control the switch with a PWM drive signal having a variable on-time (OnTime), a variable off-time (OffTime), and a variable frequency, wherein the variable OnTime and the variable OffTime are calculated to maintain a constant duty cycle (DutyCycle) for the PWM drive signal.

27. The converter of claim 26 wherein the switch has a frequency setting (Fswitch), wherein the variable OnTime=DutyCycle×(1/Fswitch), and wherein the variable OffTime=(OnTime/DutyMin)−OnTime, where DutyMin is a minimum duty cycle.

* * * * *